US009971775B2

(12) United States Patent
Laptev et al.

(10) Patent No.: US 9,971,775 B2
(45) Date of Patent: May 15, 2018

(54) METHOD OF AND SYSTEM FOR PARAMETER-FREE DISCOVERY AND RECOMMENDATION OF AREAS-OF-INTEREST

(71) Applicant: YANDEX EUROPE AG, Lucerne (CH)

(72) Inventors: Dmitry Anatolievich Laptev, Moscow (RU); Pavel Viktorovich Serdyukov, Moscow (RU); Aleksey Viktorovich Tikhonov, Vladimir region (RU); Gleb Gennadievich Gusev, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 122 days.

(21) Appl. No.: 15/190,684

(22) Filed: Jun. 23, 2016

(65) Prior Publication Data

US 2017/0024397 A1    Jan. 26, 2017

(30) Foreign Application Priority Data

Jun. 30, 2015 (RU) ................................ 2015125820

(51) Int. Cl.
*G06K 9/00* (2006.01)
*G06F 17/30* (2006.01)
*G06K 9/32* (2006.01)

(52) U.S. Cl.
CPC .... *G06F 17/30061* (2013.01); *G06F 17/3087* (2013.01); *G06F 17/30241* (2013.01); *G06K 9/3233* (2013.01)

(58) Field of Classification Search
None
See application file for complete search history.

(56) References Cited

U.S. PATENT DOCUMENTS 8,581,997 B2 * 11/2013 Lahcanski ......... G06F 17/30241
348/222.1
8,626,699 B2   1/2014 Xie et al.
(Continued)

OTHER PUBLICATIONS

Laptev et al., Parameter-Free Discovery and Recommendation of Areas-of-Interest, SIGSPATIAL'14, Nov. 4-7, 2014, Dallas/Fort Worth, TX, USA, Copyright 2014, pp. 113-122.
(Continued)

*Primary Examiner* — Shervin Nakhjavan
(74) *Attorney, Agent, or Firm* — BCF LLP

(57) ABSTRACT

A method and system for processing a user request for a recommended area of interest includes the steps of receiving the request including an indication of an electronic device geo-location and a user defined search constraint; receiving data associated with photographs associated with geo-objects, the data comprising geo-location coordinates of the photographs, the geo-location coordinates of the photographs being in proximity with the device geo-location; computing a plurality of region representations based on the geo-location coordinates of the photographs, each region representation being associated with a unique photograph density calculation parameter, the computing comprises determining a potential area of interest in each region representation, each region representation being a candidate for an optimal region representation; determining the optimal region representation based on the user defined search constraint; and displaying to the user the recommended area of interest that corresponds to the potential area of interest of the optimal region representation.

26 Claims, 6 Drawing Sheets

(56) References Cited

U.S. PATENT DOCUMENTS

| | | | |
|---|---|---|---|
| 8,676,001 B2 | 3/2014 | Brucher et al. | |
| 8,719,198 B2 | 5/2014 | Zheng et al. | |
| 8,818,715 B2* | 8/2014 | Mahapatro | G01C 21/343 340/995.24 |
| 9,021,384 B1* | 4/2015 | Beard | G06F 3/0481 382/105 |
| 2011/0137561 A1* | 6/2011 | Kankainen | G01S 5/0247 701/300 |
| 2011/0184949 A1 | 7/2011 | Luo | |
| 2012/0084000 A1 | 4/2012 | Wang et al. | |
| 2012/0233000 A1* | 9/2012 | Fisher | G06Q 30/02 705/14.71 |
| 2014/0244742 A1 | 8/2014 | Yu et al. | |

OTHER PUBLICATIONS

What's New in V2.0.1, Instagram Blog, http://blog.instagram.com/post/10993326656/v201, retrieved on Sep. 12, 2014, pp. 1-6.

Instagram Tips: How to Geotag a Picture to Your Photo Map After You're No Longer at a Location, http://www.lifeinlimbo.org/2014/05/14/instagram-tips-how-to-geotag-a-picture-to-your-photo-map-when-youre-no-longer-at-a-location/, retrieved on Sep. 12, 2014, pp. 1-6.

Spotsy Allows You to Search for Nearby Spots With Instagram Photos, http://www.simonblog.com/2013/12/06/spotsy-allows-you-to-search-for-nearby-spots-with-instagram-photos/, retrieved on Sep. 12, 2014, pp. 1-5.

Brown et al, Sharing the square: Collaborative Leisure in the City Streets, http://eprints.gla.ac.uk/3481/1/sharingthesquare.pdf, University of Glasgow, Springer 2005. Printed in the Netherlands; pp. 427-447.

\* cited by examiner

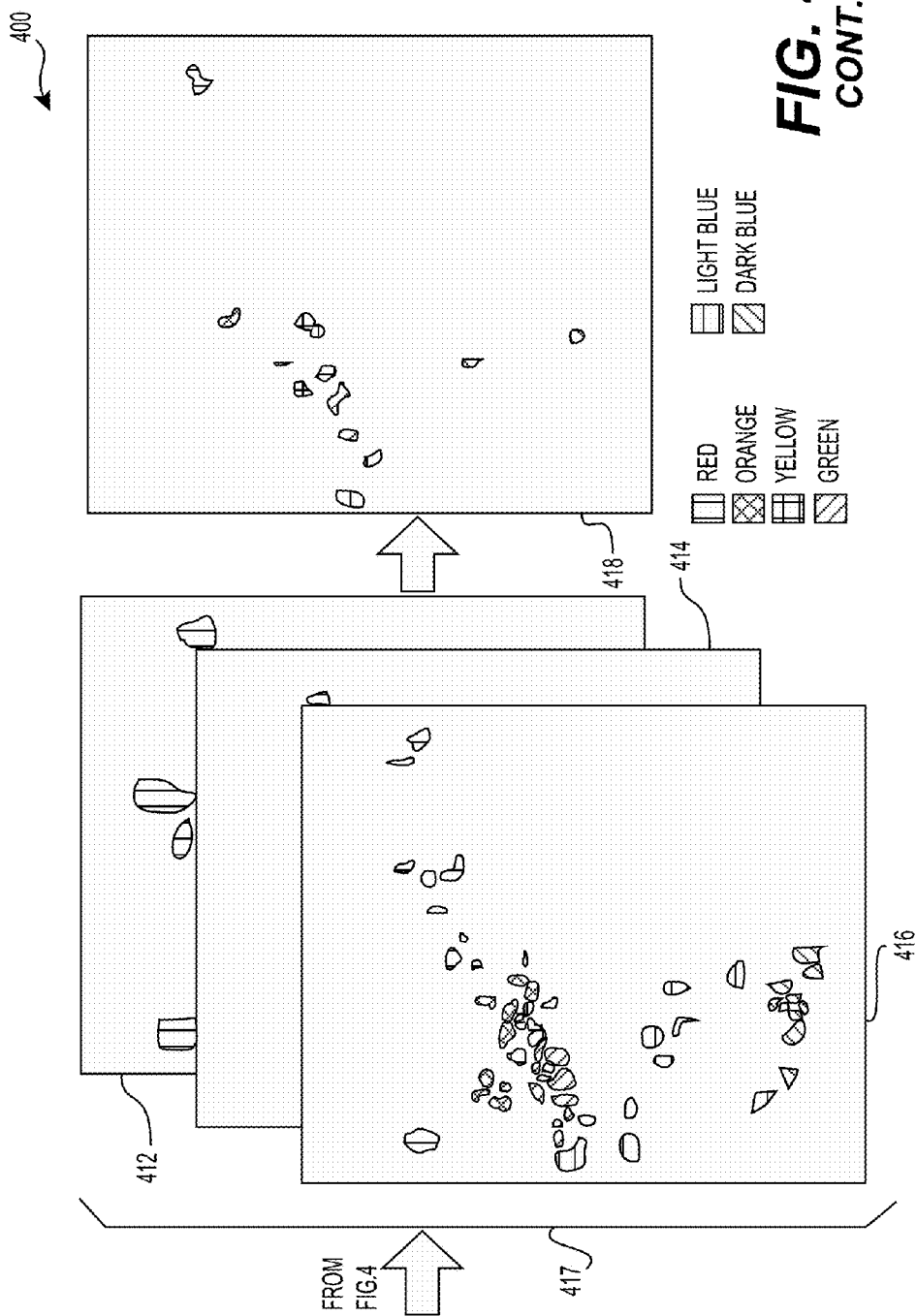

METHOD OF AND SYSTEM FOR PARAMETER-FREE DISCOVERY AND RECOMMENDATION OF AREAS-OF-INTEREST

CROSS-REFERENCE

The present application claims priority to Russian Patent Application No. 2015125820, filed Jun. 30, 2015, entitled "METHOD OF AND SYSTEM FOR PARAMETER-FREE DISCOVERY AND RECOMMENDATION OF AREAS-OF-INTEREST", the entirety of which is incorporated herein by reference.

FIELD

The present technology relates to methods of and systems for parameter-free discovery and recommendation of areas-of-interest

BACKGROUND

Travelling to new places always requires significant preparations if one wants to discover some tourist attractions or just look where to spend some spare time. For larger cities it is less of an issue since numerous traveling guides list and describe popular points of interest (POI). However, the problem arises for smaller cities with fewer popular attractions. In this case, either no relevant sources of information exist or the sources represent very subjective opinions of only a small group of a population. Therefore, user-generated data may lead to less subjective recommendations as it incorporates interests of a vast pool of users.

It is known in the art to use user-generated data for discovering and recommending different POI for tourists. However, recommending areas instead of points of interest match the traditional tourist goals and allows to robustly incorporating the interests of many users resulting in less subjective recommendations. Recommending areas of interest (AOI) may answer the following question: "Where can I spend T minutes/hours walking around to observe as many attractive places as possible?"

Various POI discovery methods are presently being applied to AOI discovery. Given a collection of geotagged photos, the task is to find POIs. Needless to say, some areas are may be considered attractive if there are many photos taken in/around the area. K-means is a well-known mean-based clustering technique that was proposed for POI discovery but can be adapted for AOI discovery. K-means partitions the whole set of photos into closely connected subsets. The center of mass of every cell can represent a specific POI, while a cell itself can represent AOI. The major disadvantage of this method is that it assigns every single point to one cluster, which may result in large cells with low photo density. Mean Shift instead looks only for areas with high photo density. Similarly to the previous technique, it starts with some coordinates and iteratively shifts them in the direction of larger density values. This results in local density peaks which may be considered as POI candidates. However, the method does not allow identifying an AOI around or in proximity to the local peak.

The most common method applied for POI and AOI discovery is DBSCAN. The method adds a new photo to a cluster, if it is within a certain radius around the already clustered photos and if it has at least a minimum number of neighboring photos. The radius and the number of neighboring photos are parameters of this clustering technique. Photos in low density regions are not clustered resulting in less interesting areas. However, the main disadvantage of the method is that for any set of parameters, the discovered regions greatly vary in size depending on their photo density. Recommending such regions to a tourist does not make much sense since the walking time spent within the regions greatly increases. A recent modification to the previous technique, called P-DBSCAN, aims at solving this problem by introducing a third parameter: maximum possible density change when adding a new point. Although it partially overcomes some disadvantages of DBSCAN, this technique requires testing for tuning the various parameters that are involved.

SUMMARY

It is an object of the present technology to ameliorate at least some of the inconveniences present in the prior art.

According to one aspect of the present technology, there is provided a method of processing a user request for a recommended area of interest, the method being executable at a server. The method comprises receiving the user request, the user request comprising an indication of an electronic device geo-location and a user defined search constraint; receiving data associated with photographs, the photographs associated with geo-objects, the data comprising geo-location coordinates of the photographs, the geo-location coordinates of the photographs being in proximity with the electronic device geo-location; determining the optimal region representation based on the user defined search constraint; and displaying to the user the recommended area of interest that corresponds to the potential area of interest of the optimal region representation.

In some implementations of the method, the unique photograph density calculation parameter is indicative of size and number of potential areas of interest within each region representation.

In some implementations of the method, each potential area of interest is associated with a density parameter, the density parameter being based on a number of the geo-location coordinates of the photographs having been mapped within the potential area of interest.

In some implementations of the method, wherein the optimal region representation comprises multiple potential areas of interest, the method further comprises, prior to the displaying, ranking the multiple potential areas of interest of the optimal region representation based on values of the density parameter of the potential areas of interest of the optimal region representation.

In some implementations of the method, the user defined search constraint comprises an additional indication, the additional indication being at least one of a current time, a period of the year, and a mean for transportation.

In some implementations of the method, the user defined search constraint is a measure of time.

In some implementations of the method, the data associated with the photographs originates from a public source.

In some implementations of the method, the data associated with the photographs originates from an electronic device.

In some implementations of the method, receiving the data associated with the photographs further comprises filtering the data associated with the photographs based on the at least one additional indication.

In some implementations of the method, computing the plurality of region representations further comprises computing a histogram representation of the geo-location coordinates of the photographs; calculating a plurality of density estimations of the histogram representation based on the unique photograph density calculation parameter; and partitioning each density estimation of the plurality of density estimations, wherein each partitioned density estimation corresponds to each region representation, respectively.

In some implementations of the method, each density estimation of the plurality of density estimations is a kernel density estimation.

In some implementations of the method, calculating a plurality of density estimations of the histogram representation comprises convoluting the histogram representation with a kernel function.

In some implementations of the method, partitioning comprises executing a watershed segmentation.

In some implementations of the method, determining the optimal region representation comprises calculating an average surface size of the potential areas of interest for each region representation within the plurality of the region representations.

According to one aspect of the present technology, there is provided a server for processing a user request for a recommended area of interest. The server comprises a processor and an information storage medium in communication with the processor and storing computer-readable instructions that cause the processor to: receive the user request, the user request comprising an indication of an electronic device geo-location and a user defined search constraint; receive data associated with photographs, the photographs associated with geo-objects, the data comprising geo-location coordinates of the photographs, the geo-location coordinates of the photographs being in proximity with the electronic device geo-location; compute a plurality of region representations based on the geo-location coordinates of the photographs, each region representation within the plurality of region representations being associated with a unique photograph density calculation parameter, to compute comprises determining a potential area of interest in each region representation, each region representation within the plurality of region representations being a candidate for an optimal region representation; determine the optimal region representation based on the user defined search constraint; and display to the user the recommended area of interest that corresponds to the potential area of interest of the optimal region representation.

In some implementations of the server, the unique photograph density calculation parameter is indicative of size and number of potential areas of interest within each region representation.

In some implementations of the server, each potential area of interest is associated with a density parameter, the density parameter being based on a number of the geo-location coordinates of the photographs having been mapped within the potential area of interest.

In some implementations of the server, wherein the optimal region representation comprises multiple potential areas of interest, the server is further configured to, prior to being configured to display, rank the multiple potential areas of interest of the optimal region representation based on values of the density parameter of the potential areas of interest of the optimal region representation.

In some implementations of the server, the user defined search constraint comprises an additional indication, the additional indication being at least one of a current time, a period of the year, and a mean for transportation.

In some implementations of the server, the user defined search constraint is a measure of time.

In some implementations of the server, the data associated with the photographs originates from a public source.

In some implementations of the server, the data associated with the photographs originates from an electronic device.

In some implementations of the server, to receive the data associated with the photographs further comprises to filter the data associated with the photographs based on the at least one additional indication.

In some implementations of the server, to compute the plurality of region representations the server is further configured to: compute a histogram representation of the geo-location coordinates of the photographs; calculate a plurality of density estimations of the histogram representation based on the unique photograph density calculation parameter; and partition each density estimation of the plurality of density estimations, wherein each partitioned density estimation corresponds to one region representation.

In some implementations of the server, each density estimation of the plurality of density estimations is a kernel density estimation.

In some implementations of the server, to calculate a plurality of density estimations of the histogram representation comprises to convolute the histogram representation with a kernel function.

In some implementations of the server, to partition comprises to execute a watershed segmentation.

In some implementations of the server, to determine the optimal region representation the server is further configure to calculate an average surface size of the potential areas of interest for each region representation within the plurality of the region representations.

In the context of the present specification, unless expressly provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless expressly provided otherwise, "client device" is any computer hardware that is capable of running software appropriate to the relevant task at hand. Thus, some (non-limiting) examples of client devices include personal computers (desktops, laptops, netbooks, etc.), smartphones, and tablets. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless expressly provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the expression "component" is meant to include software (appropriate to a particular hardware context) that is both necessary and sufficient to achieve the specific function(s) being referenced.

In the context of the present specification, unless expressly provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, the expression "interactive" is meant to indicate that something is responsive to a user's input or that at least portions thereof are responsive to a user's input.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication. Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

DETAILED DESCRIPTION

Figure 1:
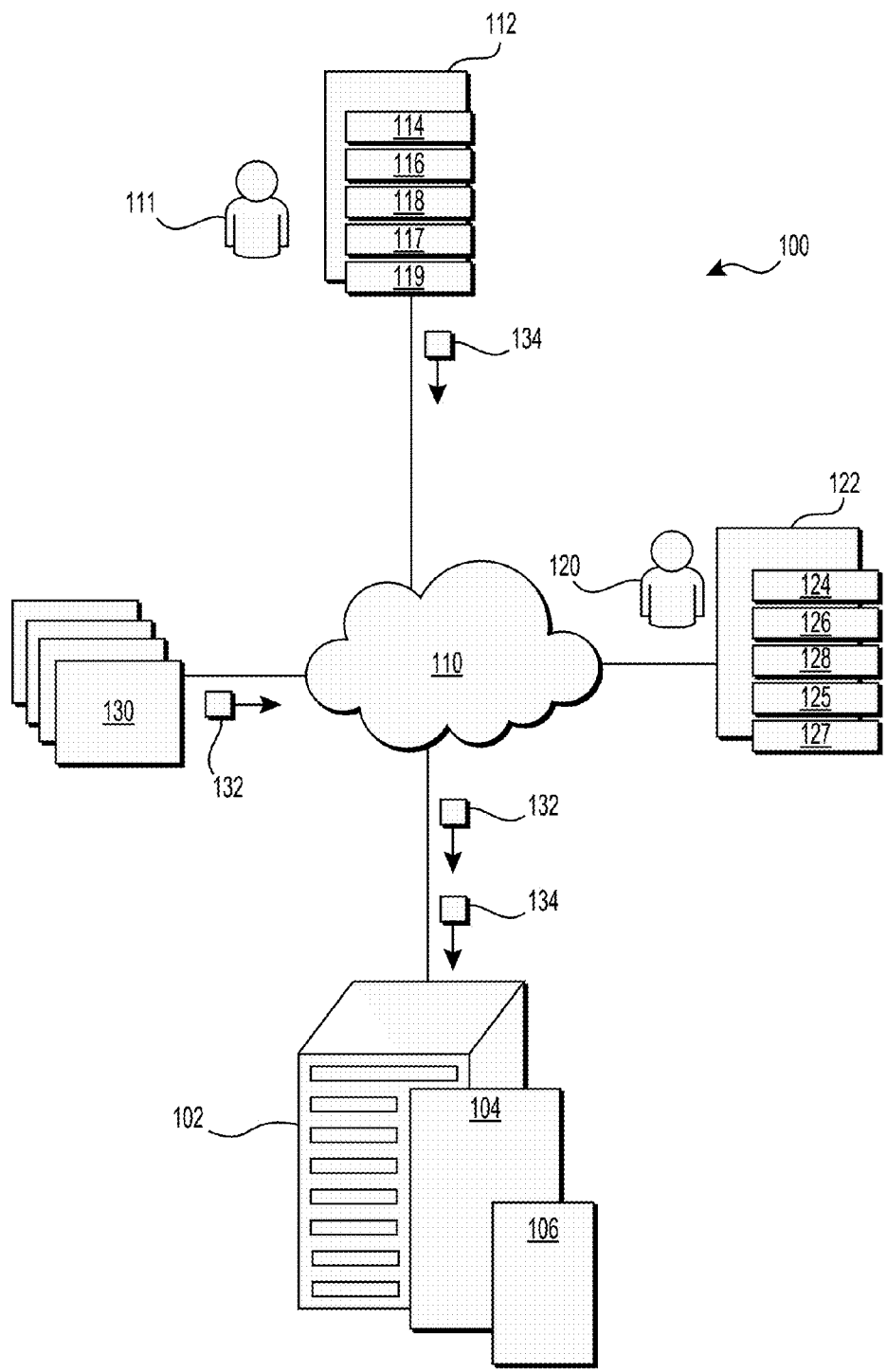
FIG. 1 is a schematic illustration of a computer system being an implementation of an embodiment of the present technology.

In FIG. 1 there is depicted a schematic diagram of various computer systems 100 which are connected to each other via a communication network 110. It is to be expressly understood that the computer systems 100 are depicted as the illustrative implementations of the present technology. Thus, the following description should be considered only as the description of illustrative implementations of the present technology. This description is not intended to define the scope or set forth the bounds of the present technology. In some cases, what are believed to be helpful examples of modifications to the computer systems 100 may also be described below. This is done merely as an aid to understanding, and, again, not to define the scope or set forth the bounds of the present technology. These modifications are not an exhaustive list, and, as a person skilled in the art would understand, other modification are likely possible. Further, where no examples of modifications have been set forth, it should not be interpreted that no modifications are possible and/or that what is described is the sole manner of implementing that, element of the present technology. As a person skilled in the art would understand, this is likely not the case. In addition it is to be understood that the computer systems 100 may provide in certain instances simple implementations of the present technology, and that where such is the case they have been presented in this manner as an aid to understanding. As persons skilled in the art would understand, various implementations of the present technology may be of a greater complexity.

How the communication link is implemented is not particularly limited and will depend on which devices are connected to the communication network 110. As a non-limiting example, the connection of a server 102 to the communication network 110 can be implemented via a wired connection (such as an Ethernet based connection). At the same time, other devices could be also connected in other ways. In those examples, where the connected device is implemented as a wireless communication device (e.g. an electronic device 112 implemented as a smart-phone), the connection can be implemented as a wireless communication network (such as but not limited to, a 3G communications network link, a 4G communications network link, a Wireless Fidelity, or WiFi® for short, Bluetooth® and the like). In those examples, where the electronic device 112 is implemented as a desktop computer, the communication link can be either wireless or wired (such as an Ethernet based connection).

The computer systems 100 comprise the server 102. The server 102 may be implemented as a conventional computer server. In an example of an embodiment of the present technology, the server 102 may be implemented as a Dell™ PowerEdge™ Server running the Microsoft™ Windows Server™ operating system. Needless to say, the server 102 may be implemented in any other suitable hardware and/or software and/or firmware or a combination thereof. In the depicted non-limiting embodiment of present technology, the server 102 is a single server. In alternative non-limiting embodiments of the present technology, the functionality of the server 102 may be distributed and may be implemented via multiple servers.

In this implementation of the present technology, the server 102 may be under control and/or management of a map service provider, for example, Yandex Maps™ service provider. In alternative implementations the server 102 can access the map service provided by a third-party provider. In yet other implementations of the present technology, the server 102 may further be under control and/or management of an application provider such as Yandex™.

The server 102 includes an information storage medium 104 that might be used by the server 102. Generally, the information storage medium 104 may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof.

The implementations of the server 102 are well known in the art. So, suffice it to state, that the server 102 comprises inter alia a network communication interface (such as a modem, a network card and the like) (not depicted) for two-way communication over the communication network 110; and a processor (not depicted) coupled to the network communication interface, the processor being configured to execute various routines, including those described herein below. To that end the processor may store or have access to computer readable instructions stored on the information storage medium 104, which instructions, when executed, cause the processor to execute the various routines described herein. The information storage medium 104 of the server 102 is configured to store data including computer-readable instructions and databases.

More specifically, the information storage medium 104 stores a database 106. In some implementations, the database 106 is configured to store various data such as: map data, information about geo-objects, metadata, etc. For example, the database 106 may be configured to store photographs, geo-location coordinates and other data. Geo-objects may be geographical descriptions of entities that are represented on maps. For instance, a vast pool of entities such as statues, buildings, parks, lakes, mountains, and the like may be represented as geo-objects by tagging their geo-locations on a map.

The computer systems 100 comprise the electronic device 112 and an electronic device 122. The electronic devices 112 and 122 are associated with users 111 and 120 respectively, and thus they can sometimes be referred to as "client devices" and/or "user electronic devices". It should be noted that the fact that the electronic devices 112 and 122 are associated with the users 111 and 120 does not need to suggest or imply any mode of operation—such as a need to log in, a need to be registered or the like.

The electronic devices 112 and 122 include information storage mediums 114 and 124, respectively. Generally, the information storage mediums 114 or 124 may be implemented as mediums of any nature and kind whatsoever, including RAM, ROM, disks (CD-ROMs, DVDs, floppy disks, hard drivers, etc.), USB keys, solid state-drives, tape drives, etc. and also the combinations thereof. The information storage mediums 114 or 124 may store user files and program instructions. In particular, the information storage mediums 114 or 124 may store the software for executing browsers 116 and 126, respectively. Generally speaking, the purpose of the browsers 116 and 126 is to enable the users 111 and 120 to execute a search or load and receive data from the server 102. Additionally, the electronic devices 112 and 122 comprise displays 118 and 128, respectively, for displaying to the users 111 and 120 the data received from the server 102.

The implementation of the electronic devices 112 and 122 is not particularly limited, but as an example, the electronic devices 112 and 122 may be implemented as personal computers (desktops, laptops, netbooks, etc.), as wireless communication devices (a cell phone, a smartphone, a tablet and the like), as well as network equipment (a router, a switch, or a gateway). In FIG. 1, the electronic devices 112 and 122 are implemented as portable devices, such as for example, Samsung™ Galaxy™ SIII, the electronic devices 112 and 122 may be executing a Yandex™ browser. It should be expressly understood that any other commercially available or proprietary browser application can be used for implementing non-limiting embodiments of the present technology.

In some embodiments of the present technology, the electronic devices 112 and 122 have camera modules 117 and 127, respectively. For example, the camera modules 117 and 127, including optical sensors (e.g., a charged coupled device (CCD), or complementary metal-oxide semiconductors (CMOS) image sensor), may be utilized to facilitate camera functions, such as recording photographs and video clips. Also, the electronic devices 112 and 122 may comprise GPS modules 119 and 125, respectively. Therefore, in different embodiments, photographs may be captured by the users 111 and 120 with other information such as, for example, date, time, geo-location coordinates and the like. Captured data may be stored in the information storage mediums 114 and 124, respectively.

The users 111 and 120 as well as the electronic devices 112 and 122 are depicted in FIG. 1 as separate users and devices for illustration purposes only. It should be noted that in some embodiments of the present technology, the users 111 and 120 may or may not be a single user and therefore, the electronic devices 112 and 122 may or may not be a single electronic device.

Furthermore, the computer systems 100 comprise public sources 130 connected to the server 102 via the communication network 110. In some implementations, the public sources 130 may comprise internet resources that provide services where end-users explicitly share their location (i.e., Foursquare™). For example, the public sources 130 may further comprise photo-sharing services such as Flickr™, Instagram™, Yandex.Photos™ or the like, which are common sources of the photographs with corresponding geo-location coordinates of attractive places.

Figure 2:
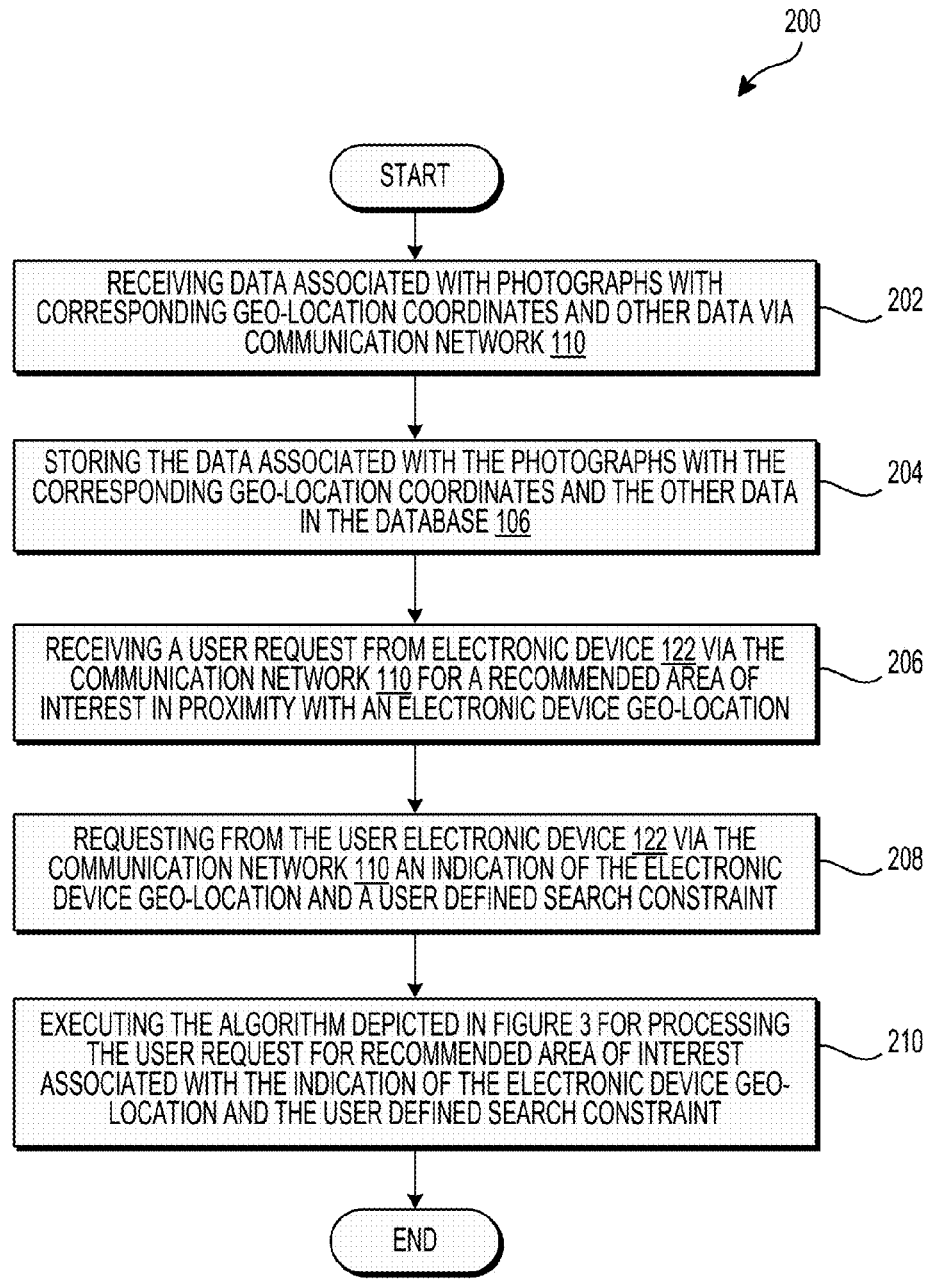
FIG. 2 illustrates a method for gathering data associated with photographs and displaying a recommended area of interest to a user.

In some non-limiting embodiments of the present technology, the computer systems 100 may execute a method of gathering information and receiving a user request, the method being depicted in FIG. 2, for recommending areas of interest. It should be noted that some steps of the method 200 may be executed in parallel or in a different sequence and that the flowchart depicted in FIG. 2 is for illustration purposes only.

Step 202: Receiving Data Associated with the Photographs

Method 200 begins with receiving by the server 102 data associated with the photographs via the communication network 110 at step 202. Needless to say, the data associated with the photographs may comprise the photographs, the corresponding geo-location coordinates of the photographs and the other data. In some cases, there may be around 600 photographs while in other cases, there may be 12000 photographs. Therefore, a number of the photographs is not a limiting aspect of the present technology.

For example, the data associated with the photographs may be obtained from different sources. Data packets 132 and 134 in FIG. 1 may comprise the data associated with the photographs. In some embodiments, the data packet 132 may originate from the public sources 130 and the data packet 134 may originate from the user electronic device 112. In other embodiments, only one data packet amongst the data packets 132 and 134 may be received by the server 102.

In one embodiment, the data packet 132 may be received from Yandex.Photos™ service which comprises a vast pool of the photographs with the corresponding geo-location coordinates and the other data. On the other hand, the data packet 134 may be received from the user electronic device 112. For example, the photographs may have been captured by the user 111 via the camera module 117 and stored in the information storage medium 114 with the geo-location coordinates and the other data that may have been recorded by the GPS module 119. In alternative embodiments, the other data may include recording dates and times of the photographs, for example. In another embodiment, the photographs may be associated with the geo-objects.

Step 204: Storing Data Associated with the Photographs

The method 200 continues to step 204 with the server 102 storing the data associated with the photographs in the database 106. In some embodiments, the geo-location coordinates of the photographs may be used to identify the position of each photograph for a map service (not depicted) or an application (not depicted), as described supra.

Step 206: Receiving a User Request

Next, at step 206, the server 102 receives via the communication network 110 the user request (not depicted) from the electronic device 122 for displaying a recommended area of interest in proximity with an electronic device geo-location (e.g., geo-location coordinates of the electronic device 122).

In some embodiments, the user 120 already has accessed the map service via the browser 126 of the electronic device 122 and sends the user request to the server 102 for displaying on the display 128 the recommended area of interest that is in proximity to the electronic device geo-location. In other embodiments, the user 120 accesses the application, which is executed on the electronic device 122, and sends the user request to the server 102 for displaying on the display 128 the recommended area of interest that is in proximity to the electronic device geo-location. A user interface of the application displayed on the display 128 of the electronic device 122 for requesting the recommended area of interest from the server 102 by the user 120 will be described further below.

For example, the recommended area of interest may be considered in proximity with the electronic device geo-location if the distance separating the geo-location coordinates of the photographs that may be used for determining the recommended area of interest and the electronic device geo-location is inferior to 200 meters or to a 5 minute walk. It should be noted that values of a proximity threshold criterion are not limiting aspects of the present technology, and therefore, any reasonable value of the proximity threshold criterion may be set in further implementations.

Step 208: Requesting an Indication of the Electronic Device Geo-Location and a User Defined Search Constraint To this end, the server 102 may request from the electronic device 122 via the communication network 110 an indication of the electronic device geo-location (e.g., the electronic device's 122 current geo-location) and a user defined search constraint at step 208.

In some embodiments of the present technology, the user defined search constraint may be a measure of time or distance. For example, the user 120 may wish to view the recommended area of interest that will take her no more than 10 minutes to explore. In another embodiment, the user 120 may decide to view the recommended area of interest that she may appreciate by undertaking a 2 km itinerary within the recommended area of interest. Needless to say, other user defined search constraints may be considered for the implementations of the present technology.

In alternative embodiments, the indication of the electronic device geo-location and the user defined search constraint may be received by the server 102 as part of or included in the user request for displaying the recommended area of interest in proximity with the electronic device geo-location. In other words, the server 102 may be configured to receive the user request including the indication of the electronic device geo-location and the user defined search constraint without the need of subsequently requesting from the electronic device 122 via the communication network 110 the indication of the electronic device geo-location and the user defined search constraint.

Figure 3:
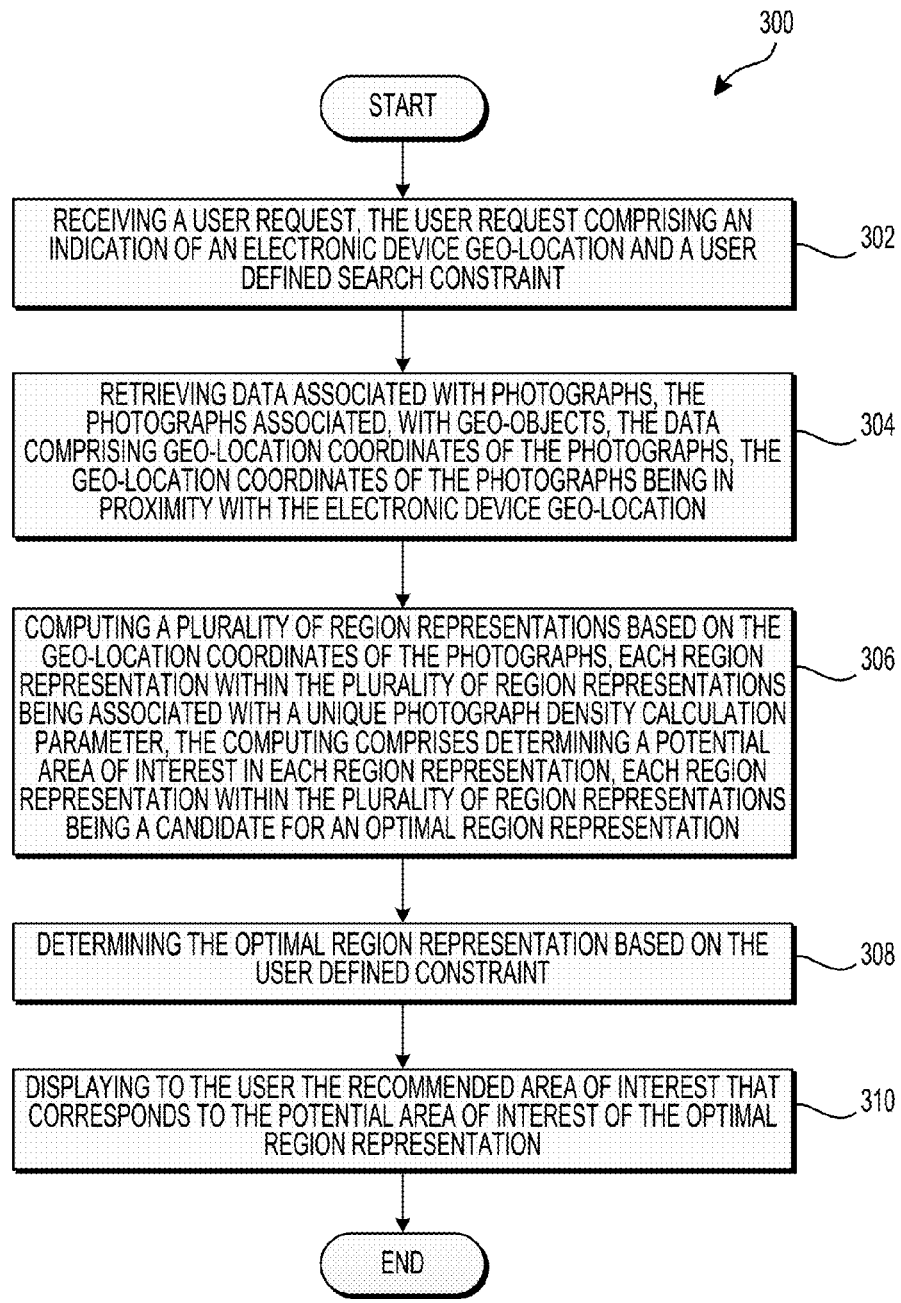
FIG. 3 illustrates a method for processing a user request for a recommended area of interest.

In some embodiments of the present technology, the server 102 may execute a method 300 depicted in FIG. 3 of processing the user request for the recommended area of interest. The method 300 will now be described.

Step 302: Receiving a User Request

The method 300, at step 302, begins with the server 102 receiving the user request which comprises the indication of the electronic device geo-location and the user defined search constraint.

Referring to FIG. 1, in some embodiments the server 102 may receive the indication of the electronic device geo-location (not depicted) and the user defined search constraint (not depicted) from the electronic device 122 via the communication network 110. For example, the indication of the electronic device geo-location may be data comprising current longitude, latitude and/or height coordinates of the electronic device 122 assessed by the GPS module 125.

Step 304: Receiving Data Associated with Photographs

The method 300 then proceeds to step 304 with the server 102 receiving the data associated with the photographs, the photographs associated with geo-objects, the data comprises the geo-location coordinates of the photographs which are in proximity with the electronic device geo-location. In other embodiments, the data may further comprise the other data.

In some embodiments, the data associated with the photographs may be received from the public sources 130 and/or from electronic devices such as the electronic device 112 following the execution of step 302. In other embodiments, the data associated with the photographs has been already stored in the database 106, following the execution of the method 200 depicted in FIG. 2, and may be received therefrom.

In an embodiment of the present technology, the server 102 may filter the data associated with the photographs before continuing with the method 300. As previously mentioned, the data associated with the photographs may comprise the photographs, the geo-location coordinates of the photographs and the other data. The server may analyse the content of the data associated with the photographs and filter the data associated with the photographs based on results of an analysis.

In some embodiments, the server 102 may filter the data associated with the photographs by comparing the distance separating the geo-location coordinates of the photographs and the electronic device geo-location with the proximity threshold criterion. After comparing, the server 102 may omit using the data associated with the photographs that does not meet the proximity threshold criterion in the execution of the method 300. In other embodiments, the server 102 may filter the data associated with the photographs by identifying the photographs associated with the geo-objects. After identifying, the server 102 may omit using the data associated with the photographs that are not associated with the geo-objects in the execution of the method 300.

It should be noted, that the server 102 may filter the data associated with the photographs differently based on additional indications. In alternative embodiments, the server 102 may filter the data associated with the photographs by comparing periods of time and/or periods of the year when the photographs were captured (i.e., information included in the other data) with an additional indication, if the additional indication is comprised in the user request. The additional indications will be described further below.

In yet another embodiment, the data associated with the photographs may have been already filtered and stored in the database 106 before it is received by the server 102.

Step 306: Computing a Plurality of Region Representations

Figure 4:
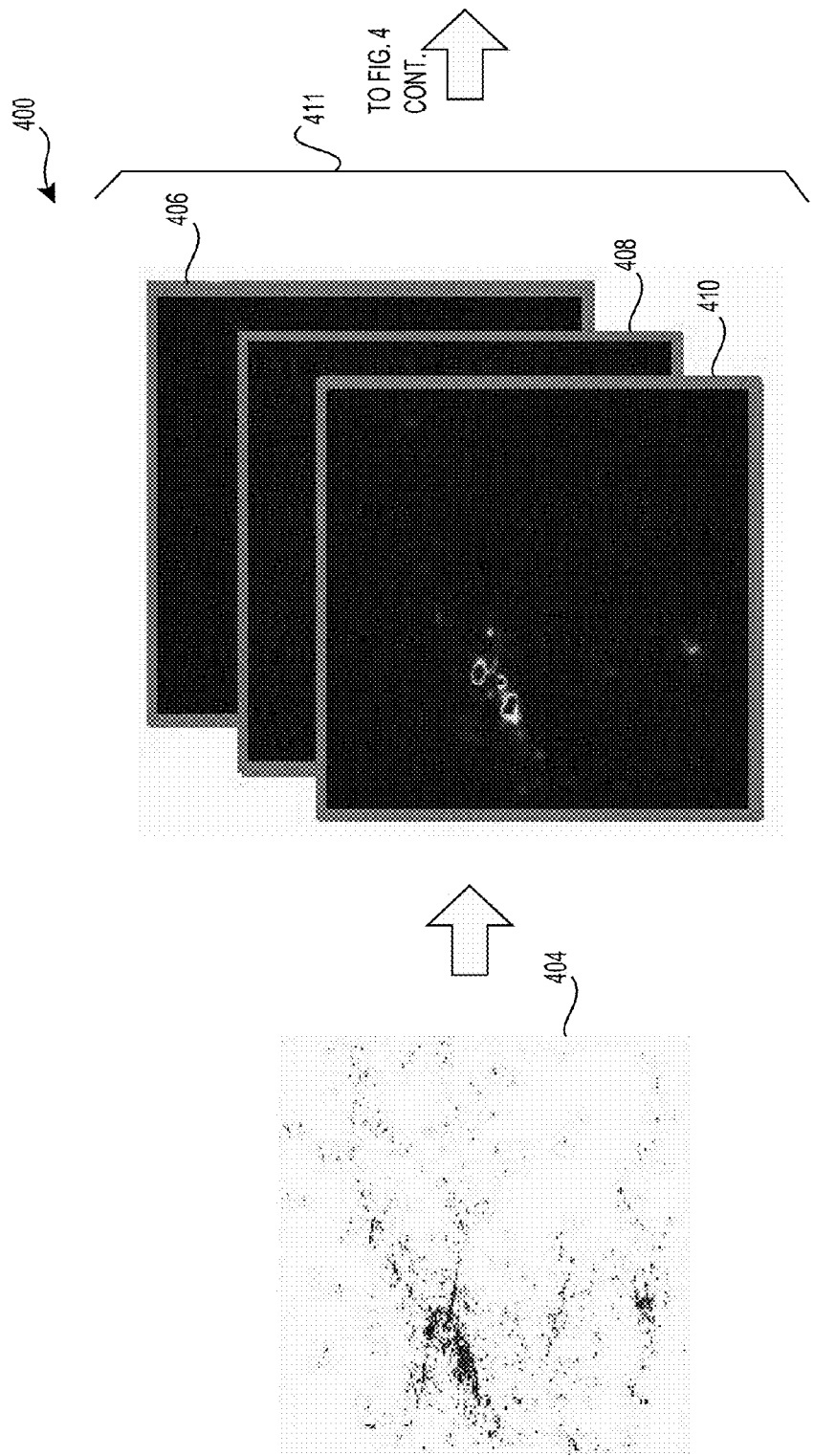
FIG. 4 illustrates computation steps executed by a server in an implementation of the present technology.

Then, with reference to FIG. 4, the method 300 continues to step 306 by computing a plurality of region representations 417 based on the geo-location coordinates of the photographs, each region representation 412, 414 and 416 within the plurality of region representations 417 is associated with a unique photograph density calculation parameter. The computing comprises determining a potential area of interest in each region representation 412, 414 and 416 with each region representation 412, 414 and 416 within the plurality of region representations 417 being a candidate for an optimal region representation 418.

In some embodiments, the geo-location coordinates of the photographs from the data associated with the photographs may be mapped to a grid (not depicted). For example, the geo-location coordinates may be mapped to the grid by means of a mapping function. Then, a histogram representation 404, depicted in FIG. 4, of the geo-location coordinates mapped on the grid is computed by the server 102. For ease of explanation, dark points (not numbered) on the histogram representation 404 correspond to the geo-location coordinates having been mapped on the grid.

In some embodiments of the present technology, the grid is a square grid such as a K by K grid. The value of K may be fixed to a pre-determined value so that the computed resolution of the histogram representation 404 is sufficient. For example, the K value may be equal to $2^{10}$, which is usually large enough for a sufficient resolution, but it can be set to a larger value.

After computing the histogram representation 404, the server 102 may calculate a plurality of density estimations 411 of the histogram representation 404. It should be noted that the plurality of density estimations 411 that is depicted in FIG. 4 is for illustration purposes, and that a higher number of density estimations 406, 408 and 410 within the plurality of density estimations 411 may be calculated by the server 102.

In probabilities and statistics, a density estimation is an estimate of an unobservable density function based on observed data. This unobservable density function is considered as the density according to which a large population is distributed and the data, on which this function is calculated, is usually considered as a random sample from that population. In other words, it is possible to estimate the density according to which the photographs have been taken in proximity with the electronic device geo-location based on the geo-location coordinates of the photographs from the data associated with the photographs.

In some embodiments, the density estimations 406, 408, and 410 within the plurality of density estimations 411 may be Gaussian kernel density estimations of the histogram representation 404. For example, the Gaussian kernel density estimation may be used to approximate a density of the geo-location coordinates of the photographs at every node of the K by K grid with the following equation:

$$D_{i,j}(h) = \frac{1}{N} \sum_{p=1}^{K} \sum_{q=1}^{K} \frac{G_{p,q}}{2\pi h} \exp\left(-\frac{(i-p)^2 + (j-q)^2}{2h^2}\right) \quad (1)$$

where h is the unique photograph density calculation parameter, N is a number of the geo-location coordinates of the photographs and G corresponds to the histogram representation 404. It should be noted that a smoothness of an estimated density grows with the unique photograph density calculation parameter. In mathematical analysis, the smoothness of a function is determined based on how many derivatives of the function exist and are continuous, as a person skilled in the art would understand. Consequently, the server 102 may approximate the density of the geo-location coordinates of the photographs at every node of the K by K grid in respect with the unique photograph density calculation parameter. For example, each density estimation 406, 408, and 410 of the histogram representation 404 corresponds to a respective value of the unique photograph density calculation parameter.

It should be noted that other functions may be used for a kernel density estimation. In other embodiments, the kernel density estimation may be calculated using a uniform, triangular, biweight, triweight, Epanechnikov and other functions, instead of a normal function (e.g., Gaussian).

In some embodiments of the present technology, the plurality of density estimations 411 may have been computed for a plurality of values of the unique photograph density calculation parameter. For example, the plurality of density estimations 411 may be computed for the plurality of values (e.g., 100 different values) of the unique photograph density calculation parameter that are between $2^{-20}$ and $2^{-1}$. It should be noted that the values and the exemplary number of values of the unique photograph density calculation parameter have been presented for ease of understanding only.

Calculating the plurality of density estimations 411 may be costly in terms of computational resources for some values of K. Direct calculation of the equation (1) may require $O(K^4)$ operations, which may be computationally infeasible for larger values of K. Therefore, in some embodiments of the present technology, the equation (1) may be interpreted as a convolution of the histogram representation 404 with the Gaussian kernel function. The convolutional representation of the equation (1) is $$D(h) = \mathit{ifft}(\mathit{fft}(G) * \mathit{fft}(g(h))) \quad (2)$$

where fft( ) is a Fast Fourier transform, ifft( ) is an inverse Fast Fourier transform, G corresponds to the histogram representation 404, g(h) is the Gaussian kernel function and "*" is the component-wise matrix multiplication operator.

The convolutional representation of the equation (1), which is equation (2), may allow the application of the convolutional theorem. In some embodiments, a number of operations executed by the server 102 may thus be reduced to $O(K^2 \log K)$. It should be noted that, in some implementations of the present technology, the convolutional representation of equation (1) may be calculated in less than a second for reasonable values of K.

Moreover, using the equation (2) instead of the equation (1) may allow additional computation optimizations. In some embodiments, fft(G) may be computed only once by the server 102 for the plurality of density estimations 411 since it does not depend on the unique photograph density calculation parameter. Furthermore, it should be noted that fft(g(h)) does not depend on the data associated with the photographs. Therefore, in other embodiments, fft(g(h)) may be pre-computed by the server 102 for different values of the unique photograph density calculation parameter prior to the execution of the method 300.

The server 102 may then partition the grid based on the plurality of density estimations 411, which results in the plurality of region representations 417. In some embodiments of the present technology, the server 102 may apply a watershed segmentation for partitioning the grid based on each density estimation 406, 408 and 410. For example, the watershed segmentation of the grid based on each density estimation 406, 408 and 410 begins by identifying nodes of the grid that correspond to local density maxima of each density estimation 406, 408 and 410. The identified nodes, also called markers, are interpreted as small clusters of nodes on the grid. Then, the small clusters of nodes are enlarged iteratively by including neighboring nodes on the grid until they either meet each other, or until they meet nodes with a low density value. In other words, applying the watershed segmentation may cluster the grid nodes of each density estimation 406, 408 and 410 and may result in region representations 412, 414 and 416, respectively.

Different methods may be implemented for identifying the nodes of the grid that correspond to the local density maxima of the plurality of density estimations 411. In some embodiments, the server 102 may compare the approximated density of the geo-location coordinates of the photographs at each node to a threshold value to identify the nodes of the grid that correspond to the local density maxima. In other embodiments, the server 102 may apply a first and second derivative test for identifying the nodes of the grid that correspond to the local density maxima. Similarly, different methods may be implemented for identifying the nodes with the low density value. In some embodiments, the server may compare the approximated density of the geo-location coordinates of the photographs at each node to another threshold value for identifying nodes with the low density value. However, it should be noted that other methods may be implemented for identifying the nodes of the grid that correspond to the local density maxima and the nodes with the low density value within the plurality of density estimations 411.

It should be noted that sizes and number of node clusters for each density estimation 406, 408 and 410 may depend on the unique photograph density calculation parameter. As previously mentioned, the smoothness of each density estimation 406, 408 and 410 may depend on its corresponding value of the unique photograph density calculation parameter. For example, if the value of the unique photograph density calculation parameter of the density estimation 406 is higher than the value of the unique photograph density calculation parameter of the density estimation 410, then the density estimation 406 will be smoother than the density estimation 410. In this case, applying the watershed segmentation on the density estimations 406 and 410 may result in fewer and larger node clusters for the density estimation 406 than for the density estimation 410.

In some embodiments of the present technology, the server 102 may consider each cluster of nodes of each region representation 412, 414 and 416 as a potential area of interest. Needless to say, the potential areas of interest are not restricted to known attractions and/or known points of interest. For example, the potential areas of interests may include a whole variety of potentially interesting areas such as parks, unusual buildings, lakes, squares, and the like.

In alternative embodiments, the node clusters for any given density estimation within the plurality of density estimations 411 may have approximately the same size. This means that the server 102 may determine the potential areas of interest of approximately the same size for the any given region representation within the plurality of region representations 417.

Step 308: Determining the Optimal Region Representation

The method 300 further continues to step 308 by determining the optimal region representation 418 based on the user defined constraint.

In alternative embodiments, the user defined constraint may comprise the additional indications. The additional indications may comprise a current time and a current period of the year. Therefore, in some embodiments, upon receiving the additional indications, the server 102 may filter the data associated with the photographs based on the additional indications, as mentioned above.

The additional indications may be beneficial to the user 120 since the recommended area of interest may be more popular and attractive during a specific time and/or specific period of the year. For example, a zone comprising a flower garden or fountains may be more attractive and popular during summer. In this case, upon receiving the additional indication of the current period of the year, the server may filter the data associated with the photographs for executing the method 300 with filtered data associated with the photographs that were taken during a same period of the year than the current period of the year. In another example, another zone comprising a vintage point may be more attractive and popular during evenings for observing sundown. In this case, the server 102 may filter the data associated with the photographs for executing the method 300 with the filtered data associated with the photographs that were taken during a same period of the day than the current period of the day.

In some embodiments of the present technology, the user 120 may request that she is desirous to view the recommended area of interest that requires approximately 10 minutes of walking time for exploration. In this case, the user defined constraint may be the measure of time. The server 102 may determine that a human walking at an average speed may explore an equivalent area of 0.1 square kilometers. The equivalent area may represent an optimal average surface size for the recommended area of interest desired to be viewed by the user 120. In other embodiments, the user 120 may request that she is desirous to view the recommended area of interest that requires approximately 10 minutes for exploration using a bicycle. In such a case, the user defined constraint may comprise the additional indication of means for transportation. Similarly, the server 102 may determine that a human riding the bicycle at an average speed may explore the equivalent area of 0.5 square kilometers. Thus, the additional indication of the means for transportation may affect the optimal average surface size of the recommended area of interest.

It should be noted that in some embodiments, the user defined constraint may be a different measure, the different measure being different from the measure of time. In alternative embodiments, the user defined constraint may comprise the indication of other means for transportation than the bicycle such as a car, for example.

In further embodiments, the server 102 may further compute an average surface size of the potential areas of interest of each region representation 412, 414 and 416 within the plurality of region representations 417. Then, the server 102 may determine that the optimal region representation 418 is a particular region representation amongst the plurality of region representations 417 whose average surface size of the corresponding potential areas of interest is the closest to the optimal average surface size for the recommended area of interest desired to be viewed by the user 120.

Step 310: Displaying to the User the Recommended Area of Interest

The method 300 ends by displaying to the user 120 the recommended area of interest that corresponds to the potential area of interest of the optimal region representation 418.

In some embodiments, the server 102 may send a trigger (not depicted in FIG. 1) to the electronic device 122 via the communication network 110 for displaying on the display 128 to the user 120 the recommended area of interest. In some cases, the optimal region representation 418 may comprise one potential area of interest and, therefore, the user 120 will be presented with one recommended area of interest.

In other cases, the optimal region representation 418 may comprise multiple potential areas of interest. In some embodiments of the present technology, the server 102 may thus rank the multiple potential areas of interest of the optimal region representation 418 based on values of a density parameter of the multiple potential areas of interest prior to sending the trigger to the electronic device 122. The server 102 may associate each potential area of interest comprised by the plurality of region representations 417 with a value of the density parameter which is based on a number of the geo-location coordinates of the photographs implicitly corresponding to a given potential area of interest. For example, the value of the density parameter of the given potential area of interest may be high if the number of the geo-location coordinates of the photographs implicitly corresponding to the given potential area of interest is high.

In alternative embodiments, the ranking of the multiple potential areas of interest may be based solely on a comparison of their respective values of the density parameter. For example, the multiple potential areas of interest may be ranked according to a descending order of the respective values of the density parameter. In yet other embodiments, the ranking may be done according to the computation of integral densities of the potential areas of interest. The integral density of a specific potential area of interest may take into account not only the value of its density parameter, but also the values of the density parameter of neighboring potential areas of interest. It should be noted that the integral density is a more robust metric for ranking than a single value of the density parameter of the specific potential area of interest as it takes the surroundings into consideration. For example, the integral density of the specific potential area of interest may be higher if it's surrounded by other potential areas of interest. Also, the integral density of the specific potential area of interest may be even higher if the other potential areas of interest are associated with high values of the density parameter. In other words, using the integral density for ranking the multiple potential areas of interest enables the server 102 to recommend the multiple potential areas of interest ranked by popularity and attractiveness of each potential area of interest and their surroundings.

It should be noted that the present technology does not require a training dataset for tuning. In other words, the method 300 may begin immediately upon the server 102 receiving the user request and receiving the data associated with the photographs. In contrast, the state-of-the-art DBSCAN and P-DBSCAN require parameter selections via cross-validation. Put another way, these prior art methods require parameter tuning using datasets from other cities for areas of interest recommendation.

Figure 5A:
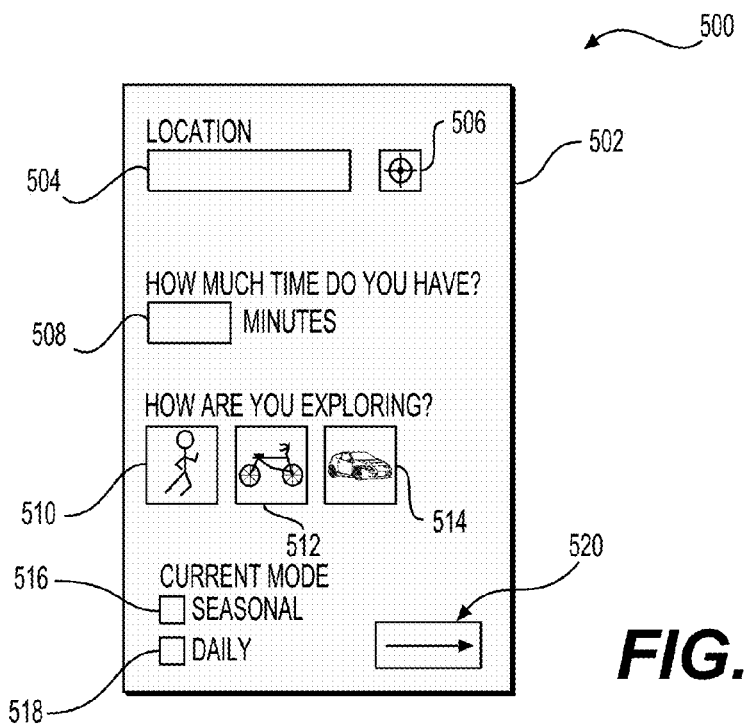
FIG. 5A illustrates a user interface for sending the user request.

In some embodiments, the electronic device 122 may display to the user 120 on the display 128 a user interface 500 depicted in FIG. 5A. The user interface 500 comprises an application window 502. The user 120 may select a button 506 for determining the electronic device geo-location. In an alternative embodiment, the user 120 may enter manually an address in an address box 504 for viewing the recommended area of interest in proximity to the address instead of the electronic device geo-location. The application window 502 further comprises a field 508 for letting the user 120 indicate how much time (in minutes) does she have for exploration of the recommended area of interest. Buttons 510, 512 and 514 enable the user 120 to select the additional indication of the means for transportation. If the user 120 selects the button 512, for example, the server 102 may receive the additional indication that the user 120 may explore the recommended area of interest at a speed equivalent to the average human biking speed. Check boxes 516 and 518 may allow the user 120 to add the additional indications of her desire to view the recommended area of interest which is more popular during the current period of the year (e.g., season) and the current period of the day (e.g., evening), respectively. Finally, button 520 may allow the user 120 to send the user request to the server 102 for processing the user request. It should be noted that additional elements may be encompassed by the application window 502 and that FIG. 5A is depicted for illustration purposes only.

Figure 5B:
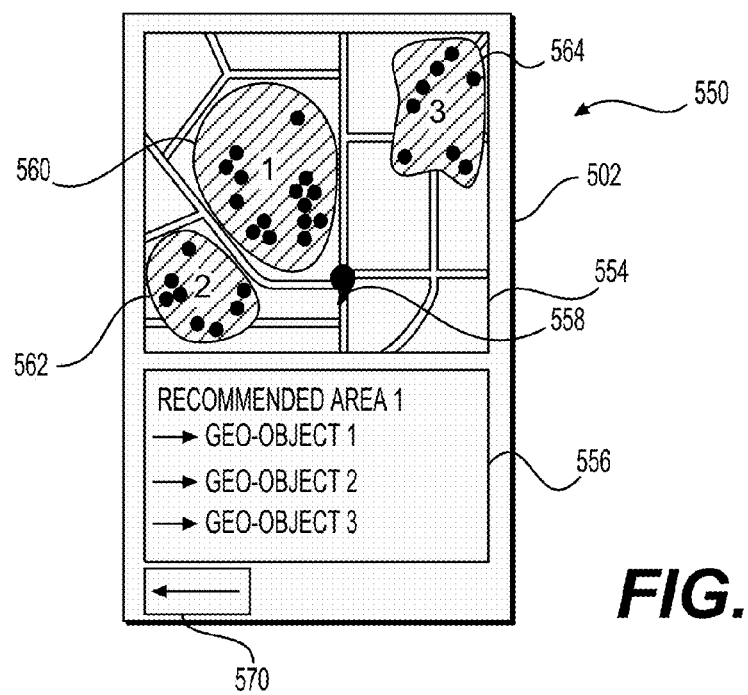
FIG. 5B illustrates a user interface for displaying the recommended area of interest.

After processing the user request for the recommended area of interest, the server 102 may send the trigger to the electronic device 122 via the communication network 110 for displaying on the display 128 to the user 120 a user interface 550 depicted in FIG. 5B.

The application window 502 may now comprise a first display area 554 and a second display area 556. In some embodiments, the first display area 554 may comprise the optimal region representation 418. In other embodiments, the first display area 554 may comprise an interactive map and an indication 558 of the electronic device geo-location (or of the address if the user 120 indicated one in the address box 504). The interactive map further comprises a first recommended area of interest 560, a second recommended area of interest 562 and a third recommended area of interest 564. The recommended areas of interest 560, 562 and 564 are ranked based on the density parameters of the corresponding potential areas of interest of the optimal region representation 418. In alternative embodiments, the recommended areas of interest 560, 562 and 564 may further comprise spots (not numbered) which correspond to the geo-location coordinates of the photographs having been taken within the recommended areas of interest 560, 562 and 564 and used during the execution of the method 300. The interactive map may allow the user 120 to select, via a mouse or a touch screen, a specific recommended area of interest for obtaining information thereon.

In another embodiment, the second display area 556 may be an interactive display area which displays information about the specific recommended area of interest. Let's say that the user 120 selected the first recommended area of interest 560. The second display area 556 may inform the user 120 that three geo-objects are encompassed by the recommended area of interest 560. The information about the three geo-objects may be displayed based on the data associated with the photographs that have been taken within the first recommended area of interest 560 and which are associated with the three geo-objects. Furthermore, the application window 502 comprises a back button 570 for allowing the user 120 to send another user request to the server 102.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

As such, from one perspective, embodiments of the present technology described above can be described as follows, structured in numbered clauses.

CLAUSE 1. A method (300) of processing a user request for a recommended area of interest, the method being executable at a server (102), the method comprising:
  a. receiving (302) the user request, the user request comprising an indication of an electronic device geo-location and a user defined search constraint;
  b. receiving (304) data associated with photographs, the photographs associated with geo-objects, the data comprising geo-location coordinates of the photographs, the geo-location coordinates of the photographs being in proximity with the electronic device geo-location;
  c. computing (306) a plurality of region representations (417) based on the geo-location coordinates of the photographs, each region representation (412, 414, 416) within the plurality of region representations (417) being associated with a unique photograph density calculation parameter, the computing comprises determining a potential area of interest in each region representation (412, 414, 416), each region representation (412, 414, 416) within the plurality of region representations (417) being a candidate for an optimal region representation (418);
  d. determining (308) the optimal region representation (418) based on the user defined search constraint; and
  e. displaying (310) to the user the recommended area of interest that corresponds to the potential area of interest of the optimal region representation (418).

CLAUSE 2. The method of clause 1, wherein the unique photograph density calculation parameter is indicative of size and number of potential areas of interest within each region representation (412, 414, 416).

CLAUSE 3. The method of clause 2, wherein each potential area of interest is associated with a density parameter, the density parameter being based on a number of the geo-location coordinates of the photographs having been mapped within the potential area of interest.

CLAUSE 4. The method of clause 3, wherein the optimal region representation (418) comprises multiple potential areas of interest, the method further comprises prior to step (d):
  ranking the multiple potential areas of interest of the optimal region representation (418) based on values of the density parameter of the potential areas of interest of the optimal region representation (418).

CLAUSE 5. The method of clause 1, wherein the user defined search constraint comprises an additional indication, the additional indication being at least one of:
  a current time;
  a period of the year; and
  a mean for transportation.

CLAUSE 6. The method of clause 1, wherein the user defined search constraint is a measure of time.

CLAUSE 7. The method of clause 1, wherein the data associated with the photographs originates from a public source (130).

CLAUSE 8. The method of clause 1, wherein the data associated with the photographs originates from an electronic device (112).

CLAUSE 9. The method of clause 5, wherein receiving (304) the data associated with the photographs further comprises filtering the data associated with the photographs based on the at least one additional indication.

CLAUSE 10. The method of clause 1, wherein computing (306) the plurality of region representations (417) further comprises:
  computing a histogram representation (404) of the geo-location coordinates of the photographs;
  calculating a plurality of density estimations (411) of the histogram representation (404) based on the unique photograph density calculation parameter; and
  partitioning each density estimation (406, 408, 410) of the plurality of density estimations (411), wherein each partitioned density estimation corresponds to each region representation (412, 414, 416), respectively.

CLAUSE 11. The method of clause 10, wherein each density estimation (406, 408, 410) of the plurality of density estimations (411) is a kernel density estimation.

CLAUSE 12. The method of clause 11, wherein calculating comprises convoluting the histogram representation (404) with a kernel function.

CLAUSE 13. The method of clause 10, wherein partitioning comprises executing a watershed segmentation.

CLAUSE 14. The method of clause 4, wherein determining the optimal region representation (418) comprises calculating an average surface size of the potential areas of interest for each region representation (412, 414, 416) within the plurality of the region representations (417).

CLAUSE 15. A server (102) for processing a user request for a recommended area of interest, the server (102) comprising a processor and an information storage medium (104) in communication with the processor and storing computer-readable instructions that cause the server (102) to execute the method of clauses 1 to 14.

What is claimed is:

1. A method of processing a user request for a recommended area of interest, the method being executable at a server, the method comprising:
   a. receiving the user request, the user request comprising an indication of an electronic device geo-location and a user defined search constraint;
   b. receiving data associated with photographs, the photographs associated with geo-objects, the data comprising geo-location coordinates of the photographs, the geo-location coordinates of the photographs being in proximity with the electronic device geo-location;
   c. computing a plurality of region representations based on the geo-location coordinates of the photographs, each region representation within the plurality of region representations being associated with a unique photograph density calculation parameter, the computing comprising:
      i. computing a histogram representation of the geo-location coordinates of the photographs;
      ii. calculating a plurality of density estimations of the histogram representation based on the unique photograph density calculation parameter;
      iii. partitioning each density estimation of the plurality of density estimations, wherein each partitioned density estimation corresponds to each region representation, respectively; and
      iv. determining a potential area of interest in each region representation, each region representation within the plurality of region representations being a candidate for an optimal region representation;
   d. determining the optimal region representation based on the user defined search constraint; and
   e. displaying to the user the recommended area of interest that corresponds to the potential area of interest of the optimal region representation.

2. The method of claim 1, wherein the unique photograph density calculation parameter is indicative of size and number of potential areas of interest within each region representation.

3. The method of claim 2, wherein each potential area of interest is associated with a density parameter, the density parameter being based on a number of the geo-location coordinates of the photographs having been mapped within the potential area of interest.

4. The method of claim 3, wherein the optimal region representation comprises multiple potential areas of interest, the method further comprises prior to step (d):
   ranking the multiple potential areas of interest of the optimal region representation based on values of the density parameter of the potential areas of interest of the optimal region representation.

5. The method of claim 4, wherein determining the optimal region representation comprises calculating an average surface size of the potential areas of interest for each region representation within the plurality of the region representations.

6. The method of claim 1, wherein the user defined search constraint comprises an additional indication, the additional indication being at least one of:
   a current time;
   a period of the year; and
   a mean for transportation.

7. The method of claim 6, wherein receiving the data associated with the photographs further comprises filtering the data associated with the photographs based on the at least one additional indication.

8. The method of claim 1, wherein the user defined search constraint is a measure of time.

9. The method of claim 1, wherein the data associated with the photographs originates from a public source.

10. The method of claim 1, wherein the data associated with the photographs originates from an electronic device.

11. The method of claim 1, wherein each density estimation of the plurality of density estimations is a kernel density estimation.

12. The method of claim 11, wherein calculating comprises convoluting the histogram representation with a kernel function.

13. The method of claim 1, wherein partitioning comprises executing a watershed segmentation.

14. A server for processing a user request for a recommended area of interest, the server comprising:
   a processor; and
   an information storage medium in communication with the processor and storing computer-readable instructions that cause the processor to:
   a. receive the user request, the user request comprising an indication of an electronic device geo-location and a user defined search constraint;
   b. receive data associated with photographs, the photographs associated with geo-objects, the data comprising geo-location coordinates of the photographs, the geo-location coordinates of the photographs being in proximity with the electronic device geo-location;
   c. compute a plurality of region representations based on the geo-location coordinates of the photographs, each region representation within the plurality of region representations being associated with a unique photograph density calculation parameter, to compute the plurality of region representations comprising to:
      i. compute a histogram representation of the geo-location coordinates of the photographs;
      ii. calculate a plurality of density estimations of the histogram representation based on the unique photograph density calculation parameter;
      iii. partition each density estimation of the plurality of density estimations, wherein each partitioned density estimation corresponds to one region representation; and
      iv. determine a potential area of interest in each region representation, each region representation within the plurality of region representations being a candidate for an optimal region representation;
   d. determine the optimal region representation based on the user defined search constraint; and
   e. display to the user the recommended area of interest that corresponds to the potential area of interest of the optimal region representation.

15. The server of claim 14, wherein the unique photograph density calculation parameter is indicative of size and number of potential areas of interest within each region representation.

16. The server of claim 15, wherein each potential area of interest is associated with a density parameter, the density parameter being based on a number of the geo-location coordinates of the photographs having been mapped within the potential area of interest.

17. The server of claim 16, wherein the optimal region representation comprises multiple potential areas of interest, prior to step (d) the server is further configured to:
rank the multiple potential areas of interest of the optimal region representation based on values of the density parameter of the potential areas of interest of the optimal region representation.

18. The server of claim 17, wherein to determine the optimal region representation the server is further configure to calculate an average surface size of the potential areas of interest for each region representation within the plurality of the region representations.

19. The server of claim 14, wherein the user defined search constraint comprises an additional indication, the additional indication being at least one of:

a current time;
a period of the year; and
a mean for transportation.

20. The server of claim 19, wherein to receive the data associated with the photographs further comprises filtering the data associated with the photographs based on the at least one additional indication.

21. The server of claim 14, wherein the user defined search constraint is a measure of time.

22. The server of claim 14, wherein the data associated with the photographs originates from a public source.

23. The server of claim 14, wherein the data associated with the photographs originates from an electronic device.

24. The server of claim 14, wherein each density estimation of the plurality of density estimations is a kernel density estimation.

25. The server of claim 24, wherein to calculate comprises to convolute the histogram representation with a kernel function.

26. The server of claim 14, wherein to partition comprises to execute a watershed segmentation.

\* \* \* \* \*